UNITED STATES PATENT OFFICE.

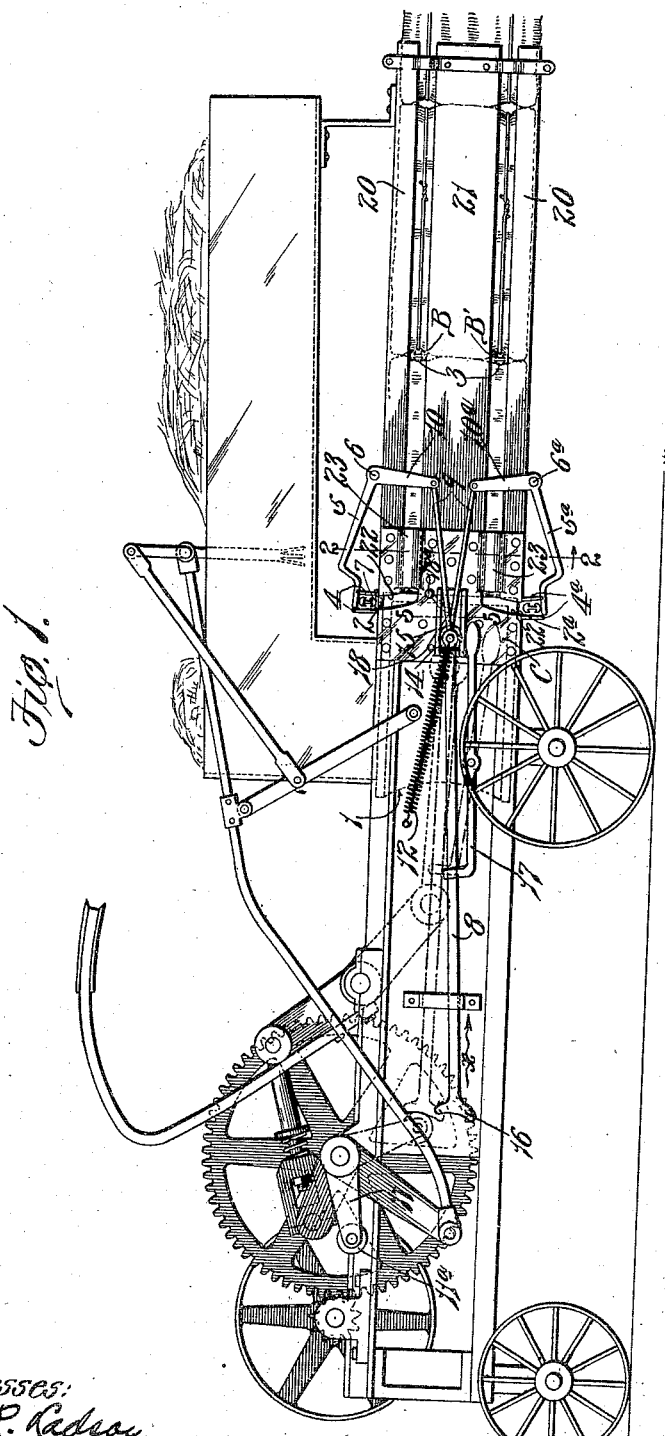

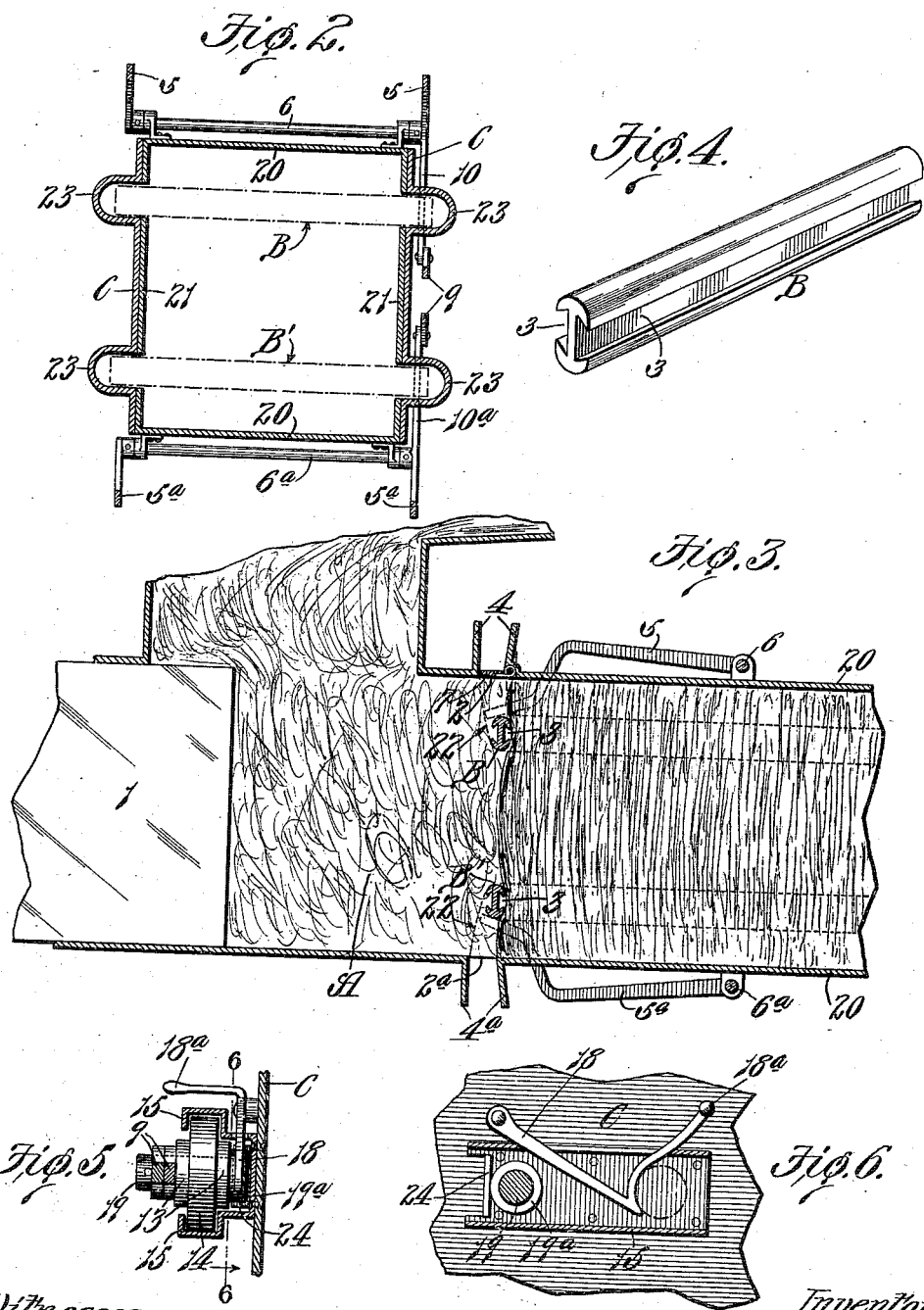

CHARLES E. WEHRENBERG, OF BELLEVILLE, ILLINOIS, ASSIGNOR TO BELLEVILLE BALER COMPANY, OF BELLEVILLE, ILLINOIS, A CORPORATION OF ILLINOIS.

BALING-PRESS.

973,151.

Specification of Letters Patent. Patented Oct. 18, 1910.

Application filed January 3, 1910. Serial No. 536,070.

*To all whom it may concern:*

Be it known that I, CHARLES E. WEHRENBERG, a citizen of the United States, residing at Belleville, Illinois, have invented a certain new and useful Improvement in Baling-Presses, of which the following is a full, clear, and exact description, such as will enable others skilled in the art to which it appertains to make and use the same.

This invention relates to baling presses, and particularly to baling presses of the type shown in my prior Patent No. 918,620, dated April 20, 1909.

One of the distinguishing characteristics of the baling press described in my prior patent above referred to is that it has a greater capacity than balers in which division boards are used, owing to the fact that the feeding of the material does not have to be discontinued at certain intervals to enable the plunger to clear up the feed opening in the baling chamber or compress the ragged end of the bale. In the press shown in said prior patent the tie wires were first arranged in wire holders that extended transversely of the baling chamber, and at certain periods in the cycle of operations of the press said wires were moved out of said holders and into the baling chamber in the path of movement of the plunger or compressing device so as to arrange said wires between the abutting ends of the two bales.

The baling press herein shown which constitutes my present invention, also overcomes the necessity of discontinuing the feeding of the material at certain intervals, but it differs slightly in construction from the press shown in my prior patent above referred to. The principal difference lies in the fact that the baler herein shown is so designed that the tie wires do not have to be inserted until after a bale has been completely formed. Another difference is the elimination of the tucking device shown in my prior patent above referred to without reducing the efficiency of the press or the superior quality of the bales produced therein. There are also several other differences in the details of construction which I will hereinafter point out.

Figure 1 of the drawings is a side elevational view of a baling press constructed in accordance with my present invention; Fig. 2 is a cross sectional view taken on approximately the line 2—2 of Fig. 1; Fig. 3 is a vertical longitudinal sectional view taken through the baling chamber and the tying chamber; Fig. 4 is a perspective view of one of the wire guides or members which permit the tie wires to be inserted after a bale has been compressed; Fig. 5 is an enlarged detail view taken on approximately the line 5—5 of Fig. 1; and Fig. 6 is a vertical sectional view taken on the line 6—6 of Fig. 5.

Referring to the drawings which illustrate the preferred form of my invention, A designates the baling chamber in which the plunger or compressing device 1 operates, and 2 and $2^a$ designate transversely extending slots or openings formed in the top and bottom walls, respectively, of the baling chamber for permitting wire guides to be introduced into the baling chamber. These wire guides preferably consist of straight bars or members B and B', each of which is provided with a pair of grooves 3 for receiving tie wires that are drawn around a bale after it has been compressed. The tie wires, of course, are not arranged in the wire guides B and B' at the time that said guides are introduced into the baling chamber but said tie wires are introduced into the grooves 3 in said guides while the bales are traveling through the tying chamber, the operator who stands on one side of the press forcing the wires through said guides, and the operator who stands at the opposite side of the press connecting the ends of the tie wires together. Flanges or projections 4 and $4^a$ are preferably arranged at the sides of the slots 2 and $2^a$ in the top and bottom walls of the baling chamber so as to form housings in which the wire guides B and B' can be arranged preparatory to introducing said guides into the baling chamber, the ends of said housings being open so that the wire guides can be slipped into same endwise. The upper wire guide B is moved downwardly into the baling chamber by means of a pair of arms 5 that are connected to a rock shaft 6, and the lower wire guide B' is moved upwardly into the baling chamber by means of a pair of arms $5^a$ which are connected to a rock shaft $6^a$, said wire guides being long enough so that they will project slightly beyond the ends of the housings in which they are arranged and thus lie in the path of movement of the arms 5 and 5ᵃ when said arms are moved inwardly or toward each other. The arms 5ᵃ form a support for the lower wire guide B′ when it is arranged between the flanges 4ᵃ, and a yielding plate 7 that normally closes the slots 2 in the top wall of the baling chamber forms a support for the upper wire guide B when it is arranged between the flanges 4 that constitute the housing for said upper wire guide, said plate being so constructed that it will yield inwardly and thus permit the upper wire guide to pass into the baling chamber.

The mechanism for actuating the arms 5 and 5ᵃ which position the wire guides, consists of a reciprocating pitman 8 that is connected to a pair of links 9 which are secured to arms 10 and 10ᵃ on the rock shafts 6 and 6ᵃ, respectively, said pitman being moved in one direction by a crank arm 11 that revolves continuously while the press is in operation, and in the opposite direction by means of a coiled contractile spring 12. The end of the pitman to which the links 9 are connected, is bifurcated so as to form jaws 13 which embrace a roller 14 that travels between a pair of channel-shaped tracks 15 secured to one of the side walls of the baling chamber, as shown in Figs. 1 and 5, and the opposite end of said pitman is provided with a head 16 that is adapted to be engaged by a roller 11ᵃ on the crank arm 11 when said pitman is arranged in a certain position. The pitman 8 normally occupies such a position that the head 16 thereon lies out of the path of movement of the roller on the crank arm 11 but means is provided for raising one end of said pitman so as to move the head thereon into position to be engaged by the roller on the crank arm. The means herein shown for raising the pitman or moving it into operative position consists of a lever 17 having one of its ends arranged under the pitman so that when its opposite end is depressed the pitman will be raised into the position shown in broken lines in Fig. 1. After the pitman has been moved into this position the crank arm 11 will engage it and move it in the direction indicated by the arrow $x$ in Fig. 1, thereby causing the arms 5 and 5ᵃ to engage the wire guides with which they coöperate and move said guides into the baling chamber in the path of movement of the plunger.

Owing to the fact that the lower wire guide B′ rests upon or is supported by the arms 5ᵃ, it is necessary for said arms to remain in their elevated position for a short period after the lower wire guide B′ has been forced into the baling chamber, and I have therefore provided means for locking the pitman when it reaches the end of its stroke in one direction; namely, after it has been actuated by the crank arm 11. Said locking means consists of a dog 18 pivotally connected to the side wall of the baling chamber and arranged in such a position that one end of same will drop downwardly and automatically engage a projection on the pitman after the wire guides have been moved into the baling chamber. The projection on the pitman with which the locking dog 18 coöperates, can be formed in various ways but I prefer the construction herein shown wherein the pin 19 that connects the links 9 and roller 14 to the pitman is provided with a head 19ᵃ that forms a stop with which the locking dog 18 coöperates. The weight of the locking dog causes it to drop downwardly into the position shown in broken lines in Fig. 6 and thus engage the head 19ᵃ of the pin on the pitman, and when it is desired to release the pitman said dog is moved upwardly or back to its normal position, the dog being provided with a handle 18ᵃ so that it can be operated conveniently.

The tying chamber, through which the bales travel after leaving the baling chamber, preferably consists of a pair of channel-shaped members 20 arranged with their vertical legs or flanges projecting inwardly or toward each other, and side plates 21 arranged between said channel-shaped members and spaced away from the legs or flanges thereof so as to form longitudinally extending slots through which the wire guides B and B′ project, as shown clearly in Fig. 1. These channel-shaped members and side plates are secured to the side walls of the baling chamber A by means of splice plates C, each of which is provided with vertical slots 22 that aline with the openings in the top and bottom walls of the baling chamber and also outwardly projecting pockets 23 that communicate with the slots 22 and with the longitudinally extending slots in the sides of the tying chamber. The outwardly projecting pockets 23 that are formed on said tie plates provide a sufficient clearance for the projecting ends of the upper and lower wire guides without weakening or reducing the strength of the tie plates.

The wire holders are inserted in the housings formed by the flanges 4 and 4ᵃ, and after the plunger 1 has compressed a sufficient quantity of material to form a bale the lever 17 is operated so as to arrange the pitman 8 in operative position. The crank 11 thereafter engages said pitman and moves it in the direction indicated by the arrow in Fig. 1, thus causing the arms 5 and 5ᵃ to move the wire holders into the baling chamber. The dog 18 drops automatically and thus locks the pitman and the arms 5 and 5ᵃ in the position to which they have been moved. When the upper wire guide B moves downwardly it will engage the ragged material at the upper rear end of the bale and wipe it smoothly down over the rear end of the bale in practically the same manner as a tucking device, said upper wire guide also operating to confine the ragged material or clamp it securely against the end of the bale. The wire guides are now arranged in operative position at one end of a bale, and as the press continues in operation said wire guides will travel longitudinally through the tying chamber with the bales, each wire guide being arranged between the abutting ends of two bales. While the bales are traveling through the tying chamber the operator who stands on one side of the press, inserts the tie wires through the grooves 3 in the wire guides, and the operator who stands at the opposite side of the press, ties the ends of said wires together. After the wire guides have entered the pockets 23 in the side walls of the tying chamber the operator lifts the locking pawl 18 so as to release the pitman 8 and permit the spring 12 to return said pitman and the positioning arms 5 and 5ª to normal position, the weight of the pitman causing it to drop downwardly far enough to hold the head 16 thereon out of the path of the rotating crank arm 11, and the head of the pin 19 coöperating with a stop 24 to limit the movement of the pitman in this direction.

From the foregoing it will be seen that a baling press of the character above described has a greater capacity than balers which employ division boards because the plunger does not have to make a number of idle strokes to clear up the feed opening or compress the material at the end of the bales sufficiently to permit the division board to be inserted in the baling chamber.

With a baler of the construction above described every movement of the plunger compresses a charge of material, and the downward movement of the upper wire guide wipes down the ragged material at the upper rear corner of the bale so as to form a neat corner on the bale, said upper wire guide thus performing practically the same function as a tucking device. The mechanism for actuating the arms which position the wire guides is of novel construction, and the tying chamber and the means for connecting same to the baling chamber is also of novel construction.

Having thus described my invention, what I claim as new and desire to secure by Letters Patent is:

1. In a baling press, wire guides adapted to be arranged above and below the baling chamber, and means for bodily moving said guides into the path of the plunger or compressing device which operates in said chamber.

2. In a baling press, wire guides adapted to be arranged transversely of the baling chamber above and below the top and bottom walls thereof, and means for simultaneously moving said guides into the path of the plunger or compressing device which operates in said chamber.

3. In a baling press, wire guides arranged adjacent transversely extending slots or openings formed in the top and bottom walls of the baling chamber, and means for bodily moving said guides through said slots into the path of the plunger or compressing device which operates in said chamber.

4. A baling press provided with a baling chamber that has slots or openings formed in the top and bottom walls thereof, and means for moving a pair of wire-receiving members through said openings and arranging them transversely across one end of a mass of material that has been compressed into the form of a bale.

5. A baling press provided with a baling chamber which has slots or openings formed in the top and bottom walls thereof, and means for introducing wire-receiving devices or guides through said openings into the baling chamber between successive strokes of the plunger or compressing device.

6. In a baling press, means for compressing charges of material, and means for moving a plurality of wire-receiving devices from an inoperative position above and below the baling chamber and arranging them transversely between some of said charges of material so as to form bales.

7. A baling press provided with means for moving a plurality of wire guides between the abutting ends of adjacent bales from positions above and below the bales.

8. In a baling press, devices for moving wire guides from positions above and below the bales into operative position between the abutting ends of adjacent bales, mechanism for operating said devices, a constantly moving member, and means for causing said mechanism to be actuated by said member.

9. In a baling press, devices for moving wire guides from an inoperative position above and below the baling chamber into an operative position inside of the baling chamber, mechanism for operating said devices, a constantly moving member, and means arranged under the control of the operator for causing said mechanism to be actuated by said constantly moving member.

10. In a baling press, devices adapted to be arranged transversely of the baling chamber adjacent openings or slots formed in the top and bottom walls thereof for receiving tie wires, and means for moving said devices into the baling chamber and holding them in the path of the plunger or compressing device which operates in the baling chamber.

11. In a baling press, devices for positioning wire guides, mechanism for operating said devices in one direction, means for locking said mechanism so as to hold said devices in a certain position, and means for returning said devices to normal position after said mechanism has been released from said locking means.

12. In a baling press, devices for positioning wire guides or moving them into the baling chamber, means for actuating said devices in one direction, a gravity-operated member coöperating with said means to hold said devices in a certain position, and means for returning said devices to normal position after said means has been released from said locking member.

13. In a baling press, devices for positioning wire guides or moving them into the baling chamber, a pitman connected to said devices, means for moving said pitman in one direction, a locking member coöperating with said pitman to hold said devices in a certain position, and yielding means for moving said pitman in the opposite direction, thus returning said devices to normal position.

14. In a baling press, devices for moving wire guides into the baling chamber, a reciprocating pitman for actuating said devices, and means for automatically locking said pitman when it reaches the end of its stroke in one direction so as to hold said devices in a certain position.

15. In a baling press, a pair of pivotally mounted members which are adapted to move wire guides into the baling chamber, an actuating mechanism for said members consisting of a reciprocating pitman, and links connecting said pitman to said members.

16. In a baling press, a pair of pivotally mounted members which are adapted to move wire guides into the baling chamber, an actuating mechanism for said members consisting of a reciprocating pitman, links connecting said pitman to said members, and a guideway coöperating with a member on said pitman.

17. In a baling press, a pair of pivotally mounted members for moving wire guides into the baling chamber, a pitman for actuating said members, a projection on said pitman, and a locking dog that automatically engages said projection when said pitman reaches a certain point in its stroke.

18. In a baling press, pivotally mounted arms arranged adjacent slots formed in the top and bottom walls of the baling chamber for moving wire guides through said slots into the baling chamber, a pitman connected to said arms, a roller on one end of said pitman, a guideway in which said roller travels, means for positively moving said pitman in one direction, and yielding means for moving said pitman in the opposite direction.

19. In a baling press, pivotally mounted arms arranged adjacent slots formed in the top and bottom walls of the baling chamber for moving wire guides through said slots into the baling chamber, a pitman connected to said arms, a roller on one end of said pitman, a guideway in which said roller travels, means for positively moving said pitman in one direction, yielding means for moving said pitman in the opposite direction, means under the control of the operator for determining when said pitman shall be moved, and means for locking said pitman after it has moved said arms into a certain position.

20. A baling press provided with a baling chamber having slots formed in the top and bottom walls thereof, a tying chamber arranged at the rear of the baling chamber, and splice plates for connecting said tying chamber and baling chamber together, said splice plates having slots that communicate with the slots in the top and bottom walls of the baling chamber and also laterally projecting pockets that form continuations of said slots.

21. A baling press provided with a tying chamber which consists of a pair of channel-shaped members arranged with their legs projecting toward each other, side plates interposed between said members and spaced away from the legs thereof so as to form longitudinally extending slots, and splice plates connecting said members and side plates together and provided with bent portions which form pockets that aline with said longitudinally extending slots.

22. A baling press provided with a baling chamber having slots or openings formed in the top and bottom walls thereof, a tying chamber arranged at the rear of the baling chamber and having longitudinally extending slots formed in the side walls thereof, and splice plates for connecting said tying chamber and baling chamber together, said splice plates having slots that communicate with the slots in the baling chamber, and pockets that form continuations of the slots in the tying chamber.

In testimony whereof I hereunto affix my signature in the presence of two witnesses, this thirtieth day of December 1909.

CHARLES E. WEHRENBERG.

Witnesses:
WELLS L. CHURCH,
GEORGE BAKEWELL.